Figure 1:
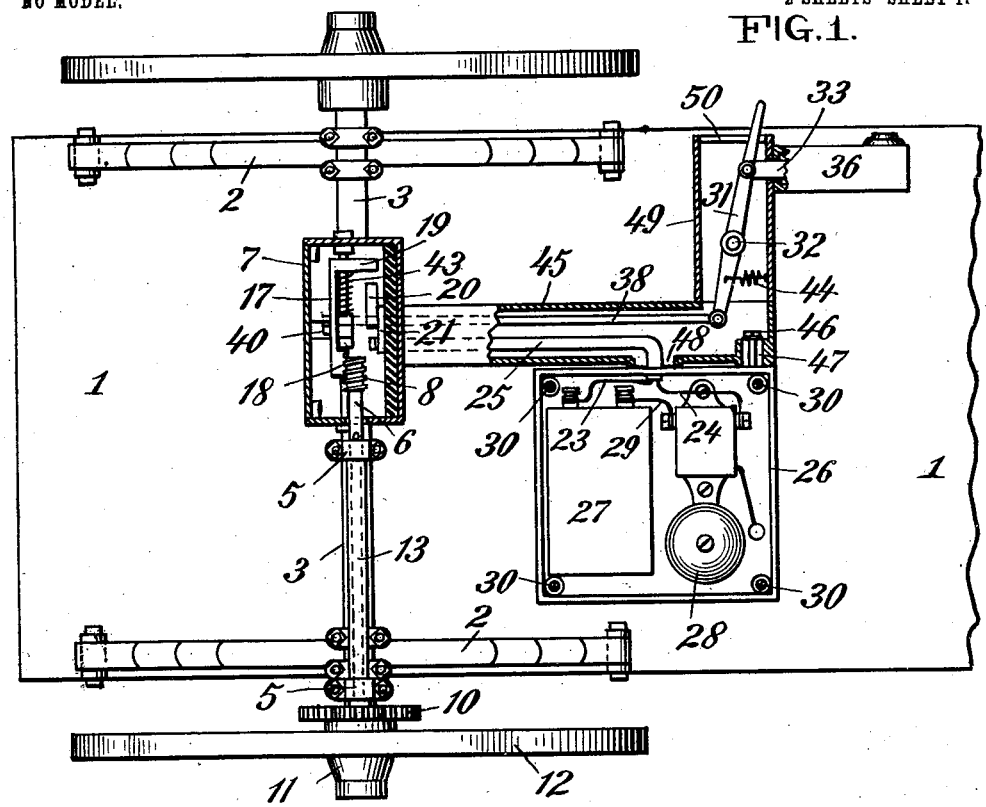

No. 734,227. PATENTED JULY. 21, 1903.
I. FRANK & J. HUTCHINSON.
GUARDING APPARATUS FOR VEHICLES OR MOVABLE STRUCTURES.
APPLICATION FILED JAN. 24, 1903.
NO MODEL. 2 SHEETS—SHEET 1.

WITNESSES:

INVENTORS
Isaac Frank
Joseph Hutchinson
BY
Richardson
ATTORNEYS

No. 734,227. PATENTED JULY 21, 1903.
I. FRANK & J. HUTCHINSON.
GUARDING APPARATUS FOR VEHICLES OR MOVABLE STRUCTURES.
APPLICATION FILED JAN. 24, 1903.
NO MODEL. 2 SHEETS—SHEET 2.

WITNESSES:
Donn Twitchell
H. M. Kuehne

INVENTORS
Isaac Frank
Joseph Hutchinson
BY
ATTORNEYS

THE NORRIS PETERS CO., PHOTO-LITHO., WASHINGTON, D. C.

No. 734,227. Patented July 21, 1903.

UNITED STATES PATENT OFFICE.

ISAAC FRANK AND JOSEPH HUTCHINSON, OF NEW YORK, N. Y.; SAID HUTCHINSON ASSIGNOR TO SAID FRANK.

GUARDING APPARATUS FOR VEHICLES OR MOVABLE STRUCTURES.

SPECIFICATION forming part of Letters Patent No. 734,227, dated July 21, 1903.

Application filed January 24, 1903. Serial No. 140,338. (No model.)

*To all whom it may concern:*

Be it known that we, ISAAC FRANK, residing at 311 East Fifty-first street, and JOSEPH HUTCHINSON, residing at 981 Sixth avenue, in the city, county, and State of New York, citizens of the United States, have invented certain new and useful Improvements in Guarding Apparatus for Vehicles or Movable Structures, of which the following is a specification.

Our invention relates to alarm apparatus applicable more particularly to a goods-truck or other vehicle for preventing stealing of the vehicle; but in some of its important features the invention is applicable to other movable structures for preventing unauthorized use of them.

In its broadest significance the invention comprises alarm mechanism of any suitable character, any approved means operative by travel of the vehicle or structure, devices operative by said travel-operated means and adapted for actuating the alarm, and suitable means for setting the alarm mechanism and holding it ready for operation during absence of the rightful user and assuring giving the alarm upon unauthorized movement of the vehicle or structure. In the most complete arrangement of apparatus the means for setting the alarm mechanism includes retaining devices associated with a lock in manner assuring retention of the alarm in operative condition when the rightful driver or user leaves the vehicle or structure and requiring operation of the lock by his key before the alarm mechanism can be made inoperative.

The invention also includes various details of construction and combinations of parts of the apparatus as adapted more especially for giving an audible alarm actuated electrically.

In embodying the invention we now prefer to use an audible alarm and to operate this alarm electrically; but other types of audible or visual alarms may be used, and they may be actuated either electrically or mechanically.

We will now describe the invention relatively to a goods-truck and an electrically-operative audible alarm arranged thereon.

Reference is made to the accompanying drawings, forming part of this specification, in which—

Figure 2:
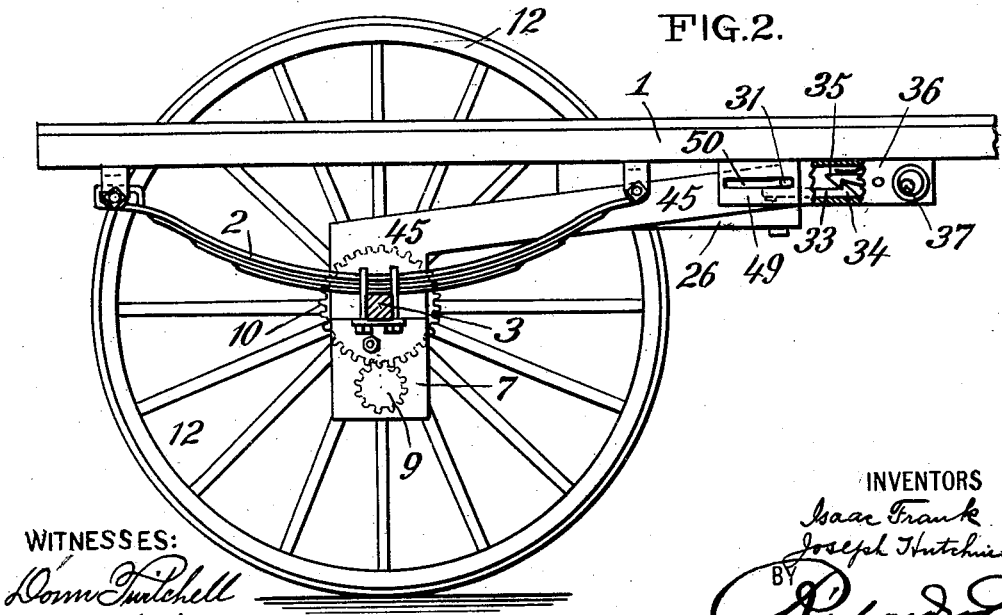
Figure 3:
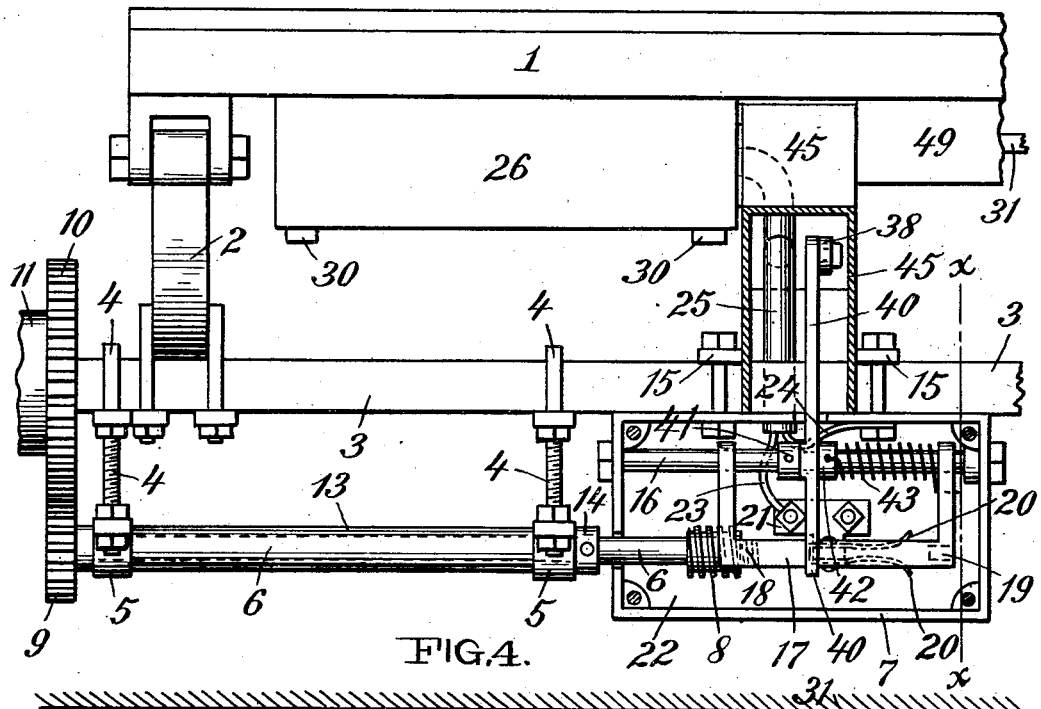
Figure 4:
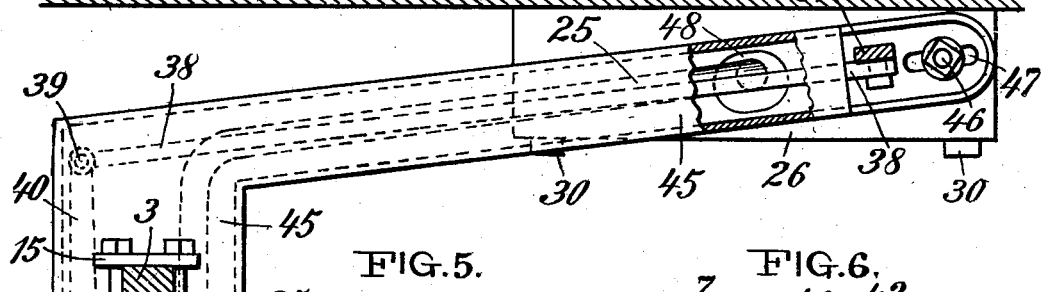
Figure 5:
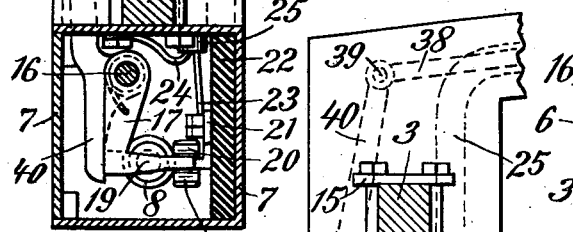
Figure 5:
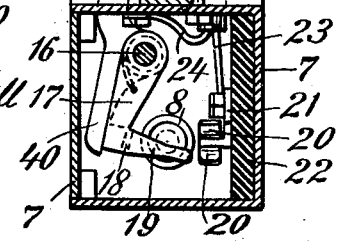
Figure 6:
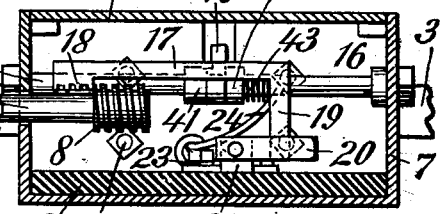

Figure 1 is a bottom plan view of rear portions of a goods-truck with a preferred electrical alarm apparatus applied thereto, parts being broken away and in horizontal section. Fig. 2 is a sectional side view thereof with the casing of a preferred lock-actuated retaining device, partly broken away. Fig. 3 is a partly-sectional enlarged rear view of left-hand portions of the truck and alarm apparatus. Fig. 4 is a partly-broken enlarged longitudinal vertical sectional side elevation, the section being taken on the line *x x* in Fig. 3 and showing the electric contacts in engagements for assuring sounding of the alarm upon movement of the vehicle. Fig. 5 is a like vertical sectional side view showing the electrical contacts separated as during ordinary use of the vehicle; and Fig. 6 is a bottom sectional plan view of the contact-setting devices adjusted as in Fig. 4.

The rear portion of the truck or vehicle body 1 is sustained in usual manner by springs 2 from the axle 3. Suitable clips 4 4 on the axle hold bearings 5 5 for a shaft 6, which at one end carries within the electrical contact-box 7 a worm 8 and at its other end preferably carries a pinion 9, engaging a gear-wheel 10 on the hub 11 of the vehicle-wheel 12 to rotate the worm-shaft in the preferred manner directly from the vehicle-wheel. We prefer to protectively inclose the shaft between its two bearings 5 5 in a tube 13, and endwise movement of the shaft is prevented, preferably, by a shoulder on the hub of pinion 9 outside of one bearing 5 and a collar 14, fixed to the shaft outside of the other bearing 5, as shown in Fig. 3 of the drawings.

The contact-box 7 is preferably held to the truck-axle 3 by clips 15 and has a transverse shaft 16, on which a yoke 17 is fitted to both rock and slide. This yoke carries a rack 18, adapted to be engaged with the worm 8 in the shaft 6. The yoke also carries a contact-finger 19, which is adapted to engage between two elastic contacts 20 20, held to a binding-plate 21, which in turn is fixed to a plate 22 of insulating fiber placed, preferably, next the inner face of the front wall of the contact-box 7. One electric wire 23 terminates at the metal plate 21, and the companion circuit-wire 24 is fastened to the metallic casing 7, and consequently may put it and the shaft 6 and the yoke 17 in the complete circuit when the contacts 19 20 are engaged with each other. The wires 23 24 pass from box 7 preferably into and through a protective tube 25, which enters the electric battery and gong box 26, and the wires 23 24, emerging from tube 25, are connected, respectively, with the battery 27 and the gong 28, which are electrically coupled by a wire 29, so that the gong will sound for giving an alarm when the circuit is closed by engagement of the contacts 19 20. The alarm-box 26 is preferably secured by bolts 30 to the under side of the truck-body 1, which makes available the elastic support of the body on the springs 2 to avoid injurious jarring of the alarm mechanism in box 26. The bolts 30 also hold in place a perforated cover of the box 26, permitting free escape of the sound therefrom.

The means for setting the alarm mechanism and holding it ready for operation should the vehicle be tampered with are here shown as a lever 31, fulcrumed at 32 and coupled to a slide 33, carrying a hook 34, adapted to be engaged by a spring-pressed hook 35, arranged at the lock 36, held to the vehicle-body. The lock mechanism may be of any class not easily picked and adapted to be actuated by a key inserted at a keyhole 37 to lift the hook 35 from the hook 34 to free the latter. The lever 31 projects at the side of the truck-body in reach of the dismounted driver of the vehicle. To the inner end of lever 31 is pivoted a rod 38, which extends rearward and is coupled at 39 to another lever 40, which extends within the contact-box 7 and is fulcrumed on the fixed shaft 16 in said box between two collars 41 42, held rigidly on the shaft. A coiled spring 43, preferably fitted loosely around the shaft 16, is fixed at one end to the collar 42 and at its other end is passed into the adjacent arm of the yoke 17, as more clearly shown in Figs. 3, 4, and 5 of the drawings. The spring 43 has a torsional effect to turn or swing the yoke 17 backward on its shaft 16 as permitted by the throwing backward of that end of lever 40 within the box 7 by a spring 44, which retracts the lever 31, rod 38, and lever 40 after the retaining-hooks 34 35 are disengaged. The spring 43 also expands to carry the yoke 17 back along the shaft 16 to normal position. Should the lever 40 be adapted to also swing the yoke backward to carry its rack 18 out of the path of revolution of the worm 8, the spring 43 need have only the expanding function to retract the yoke 17 bodily along the shaft 16.

To protect the working parts more fully from dust and dirt and also to prevent tampering with them, we arrange a casing 45 over the wire-conduit 25 and the rod 38, said casing being secured in any suitable manner at its short rear elbow portion to the truck-axle 3 or to the contact-box 7, to which it is fitted. This casing 45 is held at its upper forward end to the protective battery and gong casing 26 by a bolt 46, passing through a slot 47 of casing 45, which casing 45 also has a side opening 48 where the wire-conduit 25 enters the casing 26. This allows said casing 45 to rock on bolt 46 during depression of the springs 2 by varying loads on the vehicle and also permits relative forward and backward movement of the truck body or axle during starting or stopping of the vehicle, all without overstrains on the protective-casings 45 26. The lever 31 and the retracting-spring 44 are also preferably protected within a lateral extension-casing 49, held to the truck-body 1 and abutting the casing 45 and the case of lock 36 and having at its outer end a slot 50, through which the lever 31 extends within easy reach from the side of the truck or vehicle.

The operation of this example of our invention is as follows: When the driver stops the vehicle and dismounts with intention of leaving the vehicle, he will move the lever 31 forward in the casing-slot 50 to the position shown in Figs. 1 and 2 of the drawings, thereby engaging the slide-hook 34 with the lock-hook 35, as shown in Fig. 2 of the drawings, and also increasing the contracting tendency of the spring 44 and carrying the rod 38 rearward and causing the lever 40 to swing the yoke 17 forward from the position shown in Fig. 5 to the position shown in Figs. 1, 3, and 4 of the drawings and carrying the yoke-rack 18 into position for engagement by the worm 8 on the shaft 6. If during the absence of the driver any unauthorized person attempts to drive off with the vehicle, about two forward revolutions of its wheel 12 will cause the gears 10 9, the shaft 6, and the worm 8 to rotate, thereby causing the yoke 17 to be drawn laterally on the shaft 16 by the worm acting on its rack 18 until the yoke-contact 19 engages the elastic contacts 20 and stops there as the rack runs out of or beyond the worm, this being the relative positions of the parts shown in Fig. 6 of the drawings. The instant the contacts 19 20 touch each other the electric circuit is established between the battery 27 and the gong 28, and the gong will be sounded continuously during travel of the vehicle or should the vehicle be stopped to attract attention of police or citizens to the fact that the vehicle has been stolen and assure the arrest of the thief. The audible alarm can be stopped only by withdrawal of the yoke-contact 19 from the contacts 20, and this can be effected only by first disengaging the lock-hook 35 from the slide-hook 34 to allow the spring 44 to retract the lever 31, rod 38, and lever 40 and to permit the spring 43 by its torsion to throw the yoke 17 backward, as shown in Fig. 5, and to carry its rack 18 out of the path of revolution of the worm 8 and also allow this spring by its expansion to slide the yoke 17 back again on and along the shaft 16 from the position shown in Fig. 6 to the normal position. (Shown in Fig. 3 of the drawings.) As the hooks 34 35 can be disengaged only by the rightful driver carrying a key fitting the lock, the detection of a vehicle-thief is made practically certain by the sounding of the alarm. If no attempt be made to steal the vehicle, the alarm will not be sounded, and it requires but a few moments' time for the returned driver to insert his key at the lock 36 and disengage the hooks 35 34 and to thus allow automatic readjustment of the vehicle-guarding mechanism to the positions shown in Figs. 3 and 5 of the drawings ready for the driver to again mount the vehicle and to drive off without affecting the alarm mechanism.

In the herein-described embodiment of our invention, including a preferred electrically-operative audible alarm, the means operative by travel of the vehicle comprises the worm-actuating gearing rotated from the vehicle-wheel, and the means for setting the alarm mechanism and holding it ready for operation during absence of the driver or rightful user and assuring giving the alarm upon unauthorized movement of the vehicle comprises the lock-actuated hook engaging a hook which retains lever mechanism holding the electrical contacts in relative positions assuring closing of the circuit when the vehicle is moved forward. It will, however, be obvious to the skilled mechanic that various modifications may be made without departing from the invention, the novel features of which are more particularly defined in the appended claims.

We are aware of a prior alarm device for bicycles which when once set is operated by turning of the steering head or handle of the vehicle. Our invention is sharply distinguished from this prior construction in that the alarm is given by the bodily travel of the vehicle or structure on its supporting element—that is to say, for a wheeled vehicle the alarm is given by the travel of its wheel on the road.

We claim as our invention—

1. Guarding apparatus for vehicles or movable structures, comprising alarm mechanism, means operated by travel of the vehicle or structure, devices operative by said means and adapted for actuating the alarm, and means for setting the alarm mechanism and holding it ready for operation during absence of the rightful driver or user and assuring giving the alarm upon unauthorized travel of the vehicle or structure.

2. Guarding apparatus for vehicles or movable structures, comprising alarm mechanism, means operative by travel of the vehicle or structure, devices operative by said means and adapted for actuating the alarm, and means for setting the alarm mechanism and holding it ready for operation during the absence of the rightful driver or user and assuring giving the alarm upon unauthorized travel of the vehicle or structure; said alarm-setting means including a lock, a hand-operative device coupled for controlling the device operative by the travel-operated means, and retaining devices interposed between said hand-operative device and lock and releasable by operating the lock to make the alarm inoperative during authorized use of the vehicle or structure.

3. Guarding apparatus for vehicles or movable structures comprising an audible alarm, means operative by travel of the vehicle or structure, devices operative by said means and adapted for sounding the alarm, and means for setting the alarm mechanism and holding it ready for operation during absence of the rightful driver or user and assuring sounding of the alarm upon unauthorized travel of the vehicle or structure.

4. Guarding apparatus for vehicles or movable structures, comprising an audible alarm, means operative by travel of the vehicle or structure, devices operative by said means and adapted for sounding the alarm, and means for setting the alarm mechanism and holding it ready for operation during absence of the rightful driver or user and assuring sounding of the alarm upon unauthorized travel of the vehicle or structure; said alarm-setting means including a lock, a hand-operative device coupled for controlling the devices operative by the travel-operated means, and retaining devices interposed between said hand-operative device and lock, said retaining devices being releasable by operating the lock to make the alarm inoperative during authorized use of the vehicle or structure.

5. Guarding apparatus for vehicles or movable structures, comprising electric alarm mechanism, means operative by travel of the vehicle or structure, contacts operative by said means, and means for setting the contacts and adjusting the alarm mechanism in readiness for operation during absence of the rightful driver or user and assuring automatic adjustment of the contacts for electrically giving the alarm upon unauthorized travel of the vehicle or structure.

6. Guarding apparatus for vehicles or movable structures, comprising electric alarm mechanism, means operative by travel of the vehicle or structure, contacts operative by said means, and means for setting the contacts and adjusting the alarm mechanism in readiness for operation during absence of the rightful driver or user and assuring automatic adjustment of the contacts for electrically giving the alarm upon unauthorized travel of the vehicle or structure; said contact-setting and alarm-adjusting means including a lock, a hand-operative device coupled for controlling the devices operative by the travel-operated means, and retaining devices interposed between said hand-operative device and lock and releasable by operating the lock to make the electric alarm inoperative during authorized use of the vehicle or structure.

7. Guarding apparatus for vehicles or movable structures, comprising electric audible alarm mechanism, means operative by travel of the vehicle or structure, contacts operative by said means, and means for setting the contacts and adjusting the audible alarm mechanism in readiness for operation during absence of the rightful driver or user and assuring automatic adjustment of the contacts for electrically sounding the alarm upon unauthorized travel of the vehicle or structure.

8. Guarding apparatus for vehicles or movable structures, comprising electric audible alarm mechanism, means operative by travel of the vehicle or structure, contacts operative by said means, and means for setting the contacts and adjusting the audible alarm mechanism in readiness for operation during absence of the rightful driver or user and assuring automatic adjustment of the contacts for electrically sounding the alarm upon unauthorized travel of the vehicle or structure; said contact-setting and alarm-adjusting means including a lock, a hand-operative device coupled for controlling the devices operative by the travel-operated means, and retaining devices interposed between said hand-operative device and lock and releasable by operating the lock to make the electrical alarm inoperative during authorized use of the vehicle or structure.

9. Guarding apparatus for vehicles or movable structures, comprising electric alarm mechanism, a shaft revoluble on the vehicle or structure and carrying a worm, a swinging and sliding yoke having a rack adapted to engage the worm and also having a contact, a companion contact, means adapted to swing the yoke and engage its rack with the worm thereby putting said contacts in circuit with the alarm-giving mechanism upon unauthorized travel of the vehicle or structure, and means adapted to reversely swing the yoke and carry its rack out of the path of revolution of the worm and also disengage the contacts and restore the yoke to normal position thereby making the alarm inoperative during authorized use of the vehicle or structure.

10. Guarding apparatus for vehicles or movable structures, comprising electric alarm mechanism, a shaft revoluble on the vehicle or structure and carrying a worm, a swinging and sliding yoke having a rack adapted to engage the worm and also having a contact, a companion contact, means adapted to swing the yoke and engage its rack with the worm thereby putting said contacts in circuit with the alarm-giving mechanism upon unauthorized travel of the vehicle or structure, means adapted to reversely swing the yoke and to carry its rack out of the path of revolution of the worm and also disengage the contacts and restore the yoke to normal position thereby making the alarm inoperative during authorized use of the vehicle or structure, a hand-operative device, a lock, retaining devices interposed between said hand-operative device and lock and releasable by operating the lock, and means connecting said hand-operative device with the yoke-swinging device for adjusting the yoke to assure establishing the electric circuit and giving the alarm.

11. Guarding apparatus for vehicles, comprising electric alarm mechanism, a shaft geared for rotation by the vehicle-wheel and carrying a worm, a swinging and sliding yoke having a rack adapted to engage the worm and also having a contact, a companion contact, means adapted to swing the yoke and engage its rack with the worm thereby putting said contacts in circuit with the alarm-giving mechanism upon unauthorized travel of the vehicle, and means adapted to reversely swing the yoke and carry its rack out of the path of revolution of the worm and also disengage the contacts and restore the yoke to normal position thereby making the alarm inoperative during authorized use of the vehicle.

12. Guarding apparatus for vehicles, comprising electric alarm mechanism, a shaft geared for rotation by the vehicle-wheel and carrying a worm, a swinging and sliding yoke having a rack adapted to engage the worm and also having a contact, a companion contact, means adapted to swing the yoke and engage its rack with the worm thereby putting said contacts in circuit with the alarm-giving mechanism upon unauthorized travel of the vehicle, means adapted to reversely swing the yoke and carry its rack out of the path of revolution of the worm and also disengage the contacts and restore the yoke to normal position thereby making the alarm inoperative during authorized use of the vehicle, a hand-operative device, a lock, retaining devices interposed between said hand-operative device and lock and releasable by operating the lock, and means connecting said hand-operative device with the yoke-swinging device for adjusting the yoke to assure establishing the electric circuit and giving the alarm.

13. In guarding apparatus for vehicles, the combination, with electric alarm mechanism including a relatively fixed contact, of a swinging and laterally-movable yoke carrying an opposing contact and a rack, a worm rotated by movement of the vehicle and adapted to the yoke-rack, a spring having both torsional and expanding functions and adapted to disengage the yoke-rack from the worm and also to disengage the contacts and also to retract the yoke to normal position, and means reversely swinging the yoke to engage its rack with the worm, substantially as described.

14. In guarding apparatus for vehicles, the combination, with a vehicle-wheel, of a shaft, means rotating said shaft from the wheel, a worm on the shaft, a swinging and laterally-movable yoke carrying a rack adapted to the worm and also having a contact, opposing contacts, an electric alarm mechanism operative when the contacts are engaged, and means for reversely swinging the yoke to engage its rack with and to disengage it from the worm and for retracting the yoke to normal position, substantially as described.

15. In guarding apparatus for vehicles, the combination, with a vehicle-wheel, of a shaft, means rotating said shaft from the wheel, a worm on the shaft, a swinging and laterally-movable yoke carrying a rack adapted to the worm and also having a contact, opposing contacts, an electric alarm mechanism operative when the contacts are engaged, a spring having torsional and expanding functions and adapted to swing the yoke to disengage its rack from the worm and to disengage the contacts and to retract the yoke to normal position, and means reversely swinging the yoke to engage its rack with the worm, substantially as described.

16. In guarding apparatus for vehicles, the combination, with the vehicle-wheel, of a shaft 6 rotated by travel of the vehicle, a worm 8 on the shaft, a swinging and laterally-movable yoke 17 carrying a rack 18 adapted to the worm and also having a contact 19, opposing contacts 20, an electric alarm mechanism operative when contacts 19, 20 are engaged by movement of the yoke in one direction, means for reversely swinging the yoke including a lever 31; a lock 36 including and controlling a hook 35, and a slide 33 having a yoke 34 adapted for engagement by the hook 35; said slide being connected to the lever 31, substantially as described.

17. In guarding apparatus for vehicles, the combination, with the vehicle-wheel of a shaft 6 rotated by travel of the vehicle, a worm 8 on the shaft, a swinging and laterally-movable yoke 17 carrying a rack 18 adapted to the worm and also having a contact 19, opposing contacts 20, an electric alarm mechanism operative when contacts 19, 20 are engaged by movement of the yoke in one direction, means swinging the yoke to disengage the contacts 19, 20 and restoring the yoke to normal position, a lever 40, a rod 38 coupled to lever 40, a lever 31 coupled to rod 38, a lock 36 including and controlling a hook 35, and a slide 33 coupled to lever 31 and having a hook 34 adapted for engagement by the hook 35, and to be released by operating the lock, substantially as described.

18. In guarding apparatus for vehicles, the combination, with electric alarm mechanism on the vehicle, of a casing 7 sustained from the vehicle-axle, a shaft 16 in said casing, a swinging and a sliding yoke 17 fitted on said shaft and having a rack 18 and a contact 19, a shaft 6 revoluble by movement of the vehicle and having in the box 7 a worm 8 adapted to the yoke-rack 18, means reversely moving the yoke for engaging and disengaging the rack and the worm, an insulating-plate 22 in the box 7, a binding-plate held to the plate 22, a contact 20 on plate 21 and engageable by contact 19 when the yoke-rack engages the worm, and wires extending from the casing 7 and the contact-plate 21 to the electric alarm mechanism, substantially as described.

19. In guarding apparatus for vehicles, the combination with electric alarm mechanism at the vehicle-body, electric contacts held to the vehicle-axle, wires connecting the contacts and alarm mechanism, and a system of levers adapted for putting the contact mechanism in readiness for closing the circuit, of casings inclosing the electric alarm mechanism and contacts and wires and the lever system and protecting them from dust and dirt and preventing tampering with them, substantially as described.

20. In guarding apparatus for vehicles the combination with the vehicle of a casing held to the body thereof, electric alarm mechanism within said casing, a second casing carried by the vehicle-axle, contacts in said casing, a connecting-casing connecting said first and second casings, wire connections between the alarm mechanism and contacts, said wire connections extending through said connecting-casing, and means for closing the circuit through said connections, substantially as described.

21. In guarding apparatus for vehicles the combination with the vehicle of a casing held to the body thereof, electric alarm mechanism within said casing, a second casing carried by the vehicle-axle, contacts in said second casing, a connecting-casing connecting said first and second casings, wire connections between the alarm mechanism and contacts, said wire connections extending through said connecting-casing, and means for closing the circuit through said connections, and lock-controlled mechanical connections extending through said connecting-casing for controlling the action of the circuit-closing means, substantially as described.

In witness whereof we have hereunto set our hands in presence of two witnesses.

ISAAC FRANK.
JOSEPH HUTCHINSON.

Witnesses:
WM. WALLACE MUTH,
OTTO MUNK.